Dec. 30, 1969   R. L. DYBVAD ET AL   3,486,371
MOUNTING APPARATUS FOR MEASUREMENT ASSEMBLY
Filed Dec. 15, 1967

INVENTORS
RICHARD L. DYBVAD
PHILIP J. JOHANSEN
BY
Christensen, Sanborn & Matthews
ATTORNEYS

United States Patent Office 3,486,371
Patented Dec. 30, 1969

3,486,371
MOUNTING APPARATUS FOR MEASUREMENT ASSEMBLY
Richard L. Dybvad, Seattle, and Philip J. Johansen, Alderwood Manor, Wash., assignors to Electro Development Corporation, Lynnwood, Wash., a corporation of Washington
Continuation-in-part of application Ser. No. 620,691, Mar. 6, 1967. This application Dec. 15, 1967, Ser. No. 690,974
Int. Cl. G01b 5/30; G01m 1/12
U.S. Cl. 73—88     10 Claims

ABSTRACT OF THE DISCLOSURE

For use in accurately supporting a measurement assembly within a structural member, at each support point a protective pad is firmly bonded to the interior surface of the member. A projection from the measurement assembly is forced into firm engagement with the pad to resist relative movement between the assembly and the structural member. In one form the pad and adjacent projection define ball sockets for holding a ball between the projection and the pad. The pad may include a cup-shaped engagement portion with the edge of the cup partially cut away to permit axial access to the engagement portion by the end of the projection with th remaining part of the edge preventing further axial movement within the hollow structural member by the projection.

CROSS-REFERENCE TO RELATED APPLICATIONS

This is a continuation-in-part of copending application Ser. No. 620,691 filed Mar. 6, 1967, entitled "Load Measuring System," now abandoned.

BACKGROUND OF THE INVENTION

Field of the invention

This invention relates to measuring devices and more particularly to an improvement in mounting a measurement assembly within a hollow structural member in a fixed position.

Description of the prior art

The use of adjustable set screws or gauge points to support a measuring apparatus on a structural member is well known, as for example gauge points 165 are used to support a torque measuring apparatus in the U.S. Patent 2,392,293 to Ruge. If the supporting member is subject to flexing loads the scratches or other indentations caused by the pointed ends of the set screws may give rise to small surface cracks which may result in ultimate failure or dictate early replacement of the structural member. If the positions for the supporting contacts within the structural member are not easily accessible, it may require a long installation time for placing the measuring assembly. Such a period may cause such an expensive delay in the use of the structural member that the measuring system will not be competitive with other types of installations. It is herefore the principal object of this invention to provide a generally improved apparatus for affixing a measurement assembly to the inside of a hollow structural member without damaging the interior surface of such member.

It is another object of the instant invention to provide a generally improved apparatus for affixing a measurement assembly to a structural member which can be quickly and accurately positioned at the desired location within the member.

It is a related object of this invention to provide a self-aligning connection between a measurement assembly and its supporting member.

SUMMARY OF THE INVENTION

According to the invention, these various objects are obtained by firmly bonding protective pads to the surface of the structural member in position for engagement by locking elements projected from the measurement assembly and forced against the pads to prevent relative movement between the measurement assembly and the structural member. The structural member is thus protected against any damage which might otherwise originate from marks in the surface of the structural member left by the locking elements. In one embodiment the ends of the locking elements engage balls which are partially inserted into ball sockets formed in the protective pads. In another embodiment the pads include a cup-shaped member with a portion of the cup edge removed to permit axial access to the center of the member by the end of the locking element while the remaining edge prevents the end from further axial movement.

These and other features and advantages of the invention will become more clearly apparent from the following detailed description thereof, which is to be read with reference to the accompanying drawings.

DESCRIPTION OF THE PREFERRED EMBODIMENTS

In general, this invention concerns the accurate positioning of sensitive precision measurement devices which are secured to structural members. For ease of explanation reference is directed to the aforementioned copending application of which this application is a continuation-in-part, for details of such a measurement apparatus particularly designed for measuring loading of an axle of a vehicle such as an airplane by sensing the shear deflection of the axle which is transmitted through the support mechanism to the measurement assembly mounted within the axle. Since the measurement assembly must of necessity be of a relatively small size to be mounted within an airplane wheel axle, its supporting system must also be quite small. In addition, there is the requirement that the supporting system must firmly hold the measurement assembly so that there is no sliding of the assembly relative to the axle even under conditions of extreme temperature variations, heavy loading, and shock vibrations. Further, the supporting system must be capable of swiveling at its points of contact with the structural member as it changes shape due to variations in loading, particularly when subjected to loading in shear.

Figure 1:
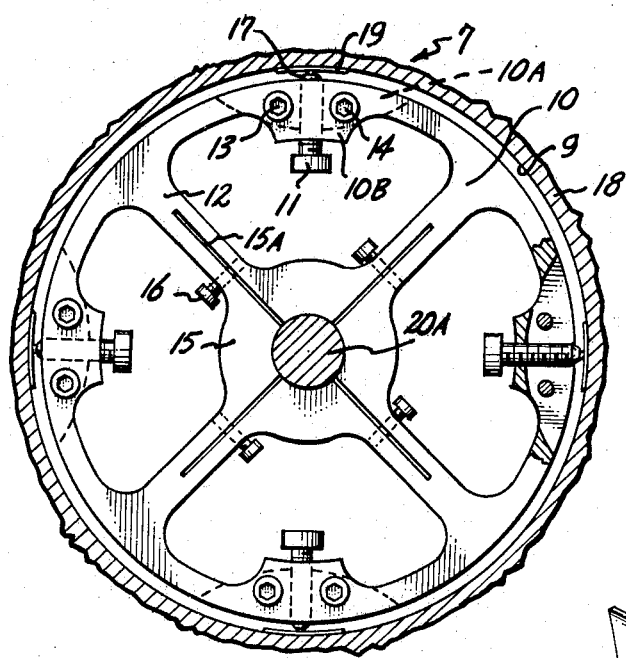
FIGURE 1 is a cross-sectional view of a structural member such as a hollow axle with a measurement assembly within its interior held in place by the first embodiment of the mounting apparatus of the instant invention.

All of these design demands have been met by the mounting apparatus shown as first embodiment 7, illustrated in FIGURE 1. As shown in FIGURE 1, one of two support members 10 for supporting displacement sensing beam end 20A, is in the general shape of a section of a right circular cylinder (and thus referred to as a disc or collar). Disc 10 is supported within the inside surface 9 of the structural member, which in this example is a hollow axle 18 for supporting a wheel of an airplane. Four circumferential slots 10A are defined in the outer edge of disc 10 with locking elements, such as pointed set screw 11, threaded therethrough. Each set screw 11 is adapted to be projected in a radial direction and then locked in position by locking screws 13 and 14 threaded through the enlargement 10B of the outer portion of disc member 10. Four hub support spokes 12 extend radially inwardly from the outer portion of disc 10 and join in the center portion to form central hub 15. Four radial slots 15A are defined by the central hub 15 and are adapted to be closed by set screws 16 threaded perpendicularly with respect thereto. The arrangement is such that an axial opening in hub 15 is adapted to receive one end 20A of the sensing beam, more fully disclosed in our aforementioned copending application, which disclosure is incorporated by reference herein. The set screws 16 are tightened so that hub 15 grips end 20A and prevents any relative movement between the disc 10 and the end 20A.

Since scratches in surface 9 of axle 18 might be the source of structural failure, it is important that the sharp ends 17 of set screws 11 are not permitted to scratch surface 9. To prevent such scratching, thin pads 19 of heat treated spring steel are firmly bonded by a suitable adhesive such as an epoxy to the axle surface 9 in alignment with the locking elements 11. In practice screws 11 are tightened against pads 19 such that disc 10 is "preloaded" by the compressive forces of the screws. The depth to which the screws 11 are seated into pads 19 is determined by the applied torque, angle of the conical points 17 and the spring constant of the spring disc 10. Once tightened, screws 11 are held in place by tightening locking screws 13 and 14. Pads 19 can be made from any metal or other material which will withstand the bearing forces of the attachment. It is important that pad 19 be thin enough so that it will follow the surface strain of the structural member, as it deflects, without exceeding the shear strength of the bonding agent. One typical thickness for pads 19 which has performed with good results is 0.020 inch.

While in embodiment 7, shown in FIGURE 1, four set screws 11 are shown, the number of locking elements is not critical as long as there are at least two diametrically opposed locking elements or one locking element extending outwardly from the disc on each side of a diameter through disc 10. It has been found that suitable support is provided by one locking means extending a fixed distance out from disc 10 diametrically opposite of an adjustable locking means. With this arrangement it is a simple matter to position disc 10 since it only requires the placement of two pads and the adjustment of one adjustable locking means.

Since it is possible that the inside surface 9 of the hollow shaft 18 might become instantaneously deformed under certain conditions of loading, such deformation may cause the disc 10 to cup or bow even though there is no relative movement of the locking elements along the surface 9. The sharp points 17 of the first embodiment 7 locking elements permit such change of angular relation or swivel between the disc 10 and the surface 9 of shaft 18.

Figure 2:
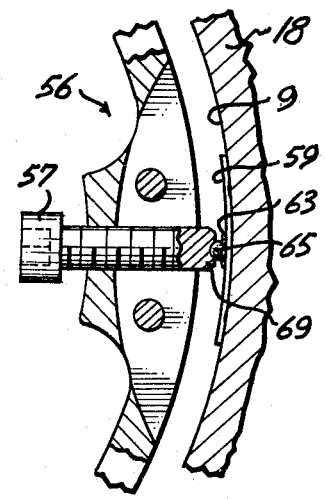
FIGURE 2 is a cross-sectional view of a second embodiment of the mounting apparatus of the instant invention.
Figure 3:
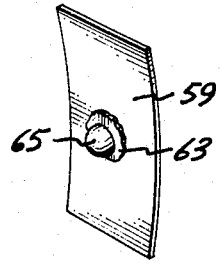
FIGURE 3 is an isometric view of the second embodiment positioning pad shown in FIGURE 2.

The ball joint configuration of the second embodiment 56 shown in FIGURE 2 requires a lesser thickness for the pad 59. As shown in FIGURE 2, the set screw 57 engages pad 59 through a ball 65 which is spot welded under pressure causing the ball to melt in the portion 63 contacting pad 59 without deforming the exposed portion of the ball 65, as shown in FIGURE 3. The ball 65 could also be soldered, brazed or otherwise made integral with pad 59. The extended end of screw 57 defines a ball socket 69 providing a bearing surface for engaging ball 65. Pad 59 is firmly bonded to surface 9 of wheel axle 18.

Figure 4:
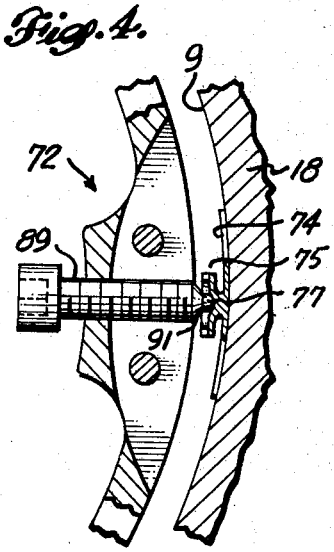
FIGURE 4 is a cross-sectional view of a third embodiment of the mounting apparatus of the instant invention.
Figure 5:
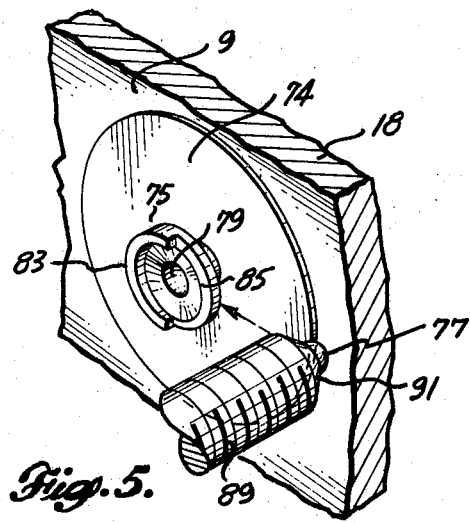
FIGURE 5 is an isometric view of the third embodiment of the positioning pad shown in FIGURE 4.

The third embodiment 72, is shown in FIGURES 4 and 5, and includes pad 74 firmly bonded to surface 9 of axle 18. Pad 74 includes a pedestal 75 having a cup-like opening facing the corresponding extending locking element 89. The cup is defined by backstop edge 83 and lower front edge 85, with a ball socket 79 formed in the center of pedestal 75. Socket 79 provides a support for ball 77 which is welded to the conical end 91 of locking screw 89.

As shown in FIGURE 5, when locking screw 89 is being inserted into locking position it is moved axially in the direction of the arrow. The lower edge 85 permits the ball 77 to pass but the higher edge 83 prevents farther axial movement so that ball 77 is accurately guided into position over ball socket 79 wherein it is firmly held by a further extension of adjustable locking element 89. The adjustable set screw 89 forces the projecting element 77 into engagement with pad 74. This radial force assists the bonding agent to prevent slipping of the pad 74 and set screw 89 relative to surface 9.

It is therefore seen that there has been provided in the form of the pads and locking elements disclosed herein, a generally improved means for accurately positioning and securely holding measurement assemblies within a hollow structural member without damaging the supporting member. If replacement of the measurement assembly is required the use of the accurately placed pads permits easy replacement in the exact spot where the previously used assembly was positioned.

What is claimed is:

1. An apparatus for affixing a measurement assembly within a hollow structural member comprising:
   substantially flat thin pad means positioned in firm attachment with the interior surface of said hollow structure,
   a cylindrical supporting ring having a plurality of radial spokes and a central hub connected thereto for holding the measurement assembly and of a size and shape to be insertable into said hollow structure, and
   locking means extending radially outwardly from said supporting ring for engagement by the ends thereof with said pad means for suspending said supporting ring in a fixed position within and relative to said hollow structure.

2. The apparatus of claim 1, wherein said locking means includes at least one projecting element on each side of a diameter passing through said supporting ring.

3. The apparatus of claim 2, wherein at least one of said projecting elements is radially adjustable.

4. The apparatus of claim 1, wherein said locking means includes at least two projecting elements on diametrically opposite points on said supporting ring with at least one of said elements being radially adjustable.

5. The apparatus of claim 1, wherein said pad means includes a ball socket for holding a ball which is positioned between said pad means and said locking means.

6. The apparatus of claim 5, wherein said ball means is securely bonded to said pad means.

7. The apparatus of claim 5, wherein:
   said pad means includes a pedestal defining said ball socket between two edges,
   one of said edges projecting radially inwardly from said interior surface farther than the other of said edges.

8. A pad means for accurately positioning a locking means relative to an interior surface of a hollow structural member, comprising:
   a body member contoured to the form of said interior surface and firmly bonded to said interior surface, and
   ball socket means defined within said body member for firmly holding a bearing ball, said ball socket means being a pedestal having an outer edge surrounding said ball socket with a portion of said edge being lower than the rest of the edge to permit transverse access to said ball socket.

9. An apparatus for affixing a measurement assembly within a hollow axle comprising:
   a plurality of pad members bonded to the interior surface of the axle, and
   a plurality of pad engaging and measurement assembly supporting elements engaged with said pad members and including means forcing said elements radially outwardly against said pad members.

10. The apparatus of claim 9 wherein at the point of engagement between said pad engaging elements and said pads there is formed a ball and socket connection permitting said elements to swivel relative to said pads.

References Cited

UNITED STATES PATENTS

| | | | |
|---|---|---|---|
| 1,970,122 | 8/1934 | Beth. | |
| 2,656,717 | 10/1953 | Fourmanoit | 73—88 |
| 2,809,044 | 10/1957 | Landreth. | |
| 3,063,576 | 11/1962 | Hofmeister | 214—2 |
| 3,203,234 | 8/1965 | Westcott et al. | 73—141 |
| 1,827,805 | 10/1931 | Watts | 73—100 |
| 2,962,275 | 11/1960 | Thurston | 73—141 XR |
| 3,091,961 | 6/1963 | Piell | 73—141 |

CHARLES A. RUEHL, Primary Examiner

U.S. Cl. X.R.

73—65